(12) United States Patent
Feldmeier

(10) Patent No.: US 6,814,528 B1
(45) Date of Patent: Nov. 9, 2004

(54) DEVICE FOR SUPPORTING A MACHINE PART WHEN SUBJECTED TO FORCE

(75) Inventor: Fritz Feldmeier, Nürnberg (DE)

(73) Assignee: Paul Muller GmbH. & Co. KG, Nuremberg (DE)

( * ) Notice: Subject to any disclaimer, the term of this patent is extended or adjusted under 35 U.S.C. 154(b) by 0 days.

(21) Appl. No.: 10/130,572
(22) PCT Filed: Nov. 14, 2000
(86) PCT No.: PCT/DE00/03954
§ 371 (c)(1), (2), (4) Date: Jul. 23, 2002
(87) PCT Pub. No.: WO01/38026
PCT Pub. Date: May 31, 2001

(30) Foreign Application Priority Data

Nov. 20, 1999 (DE) .......................................... 199 55 907

(51) Int. Cl.⁷ ................................................ B23C 5/26
(52) U.S. Cl. .................. 409/233; 409/231; 408/239 R; 279/125; 279/4.01
(58) Field of Search ........................ 409/233, 231–232; 408/239 R, 239 A; 279/4.01, 1.25

(56) References Cited

U.S. PATENT DOCUMENTS 5,078,558 A * 1/1992 Arai et al. .................. 409/233
5,739,607 A * 4/1998 Wood, III .................... 409/233
6,079,919 A * 6/2000 Zosi ........................... 409/233

FOREIGN PATENT DOCUMENTS

DE 3726305 A1 * 2/1989
FR 2481633 A1 * 11/1981
JP 59-196141 A * 11/1984

* cited by examiner

Primary Examiner—Erica Cadugan
(74) Attorney, Agent, or Firm—Steinberg & Raskin, P.C.

(57) ABSTRACT

The invention relates to a device for supporting a first machine part when a second machine part is subjected to force, the second machine part being mounted on the first machine part or being accommodated therein, in particular device for supporting a shaft (1) having a tension rod (2), which can be displaced in the axial direction, when the tension rod (2) is subjected to force, for example for changing parts of tools mounted on the shaft in automatic processing machines, a first adjustable component being provided for introducing a counterforce into the first machine part for the purpose of supporting the first machine part in a stable position, and a second adjustable component being provided for subjecting the second machine part to force.

6 Claims, 6 Drawing Sheets

DEVICE FOR SUPPORTING A MACHINE PART WHEN SUBJECTED TO FORCE

FIELD OF THE INVENTION

The invention relates to a device for supporting a first machine part when a second machine part is subjected to force. The second machine part is mounted on the first machine part. The device supports a shaft having a tension rod, which can be displaced in the axial direction, when the tension rod is subjected to force.

BACKGROUND OF THE INVENTION

In the case of rotating systems, it is generally required for a force to be introduced when at a standstill, and any contact between the rotating part and the force-introducing unit has to be avoided during the rotation. This is the case with part-changing mechanisms on rotating parts, for example in the case of spindles in automatic processing machines. In this case, the housing and the piston rod of the unit for introducing the force are conventionally arranged in a manner such that they can be displaced freely, and there is a fixed collar on the rotating machine part, against which the parts, which are provided with a gripping means, for example in the form of ratchet levers, and are connected to the cylinder housing, come to bear first and thus enclose the force flux within themselves before the force-introducing actuating force becomes effective. Solutions of this type frequently require considerable structural space.

Another solution, but one which is fairly unfavourable, is to support the forces which act outwards in the mounting of the rotating machine part without an internal frictional connection, which has a negative effect on the accuracy, the wear and the running properties.

OBJECTS AND SUMMARY OF THE INVENTION

The invention is based on the object of providing a particularly compact device for supporting a first machine when a second machine part is subjected to force.

DETAILED DESCRIPTION OF THE INVENTION

The device according to the invention comprises a first component which can be adjusted hydraulically, pneumatically or in an electrically powered/electromagnetic manner via a threaded drive, for introducing a counterforce into the first machine part for the purpose of supporting the first machine part in a stable position, and a second component which can be adjusted powered/electromagnetic manner via a threaded drive, for subjecting the second machine part to force. The first and second components are activated at the same time and, in the manner of two cylinders acting counter to each other, equalize the internal force flux, in a manner similar to how this happens when a syringe is actuated.

In this case, the first and second components can have a piston arrangement, a diaphragm cylinder or an electromagnetic/electrically powered adjusting mechanism.

In the case of a design as a piston arrangement, the relief piston of the first component for introducing a counterforce is placed against a collar connected fixedly to the first machine part. At the same time, the relief piston comes to bear against the cylinder housing on a surface which is coordinated precisely in terms of size with the collar, which supports the counterforce of the relief piston, with the result that force is not introduced into the first machine part during support of the latter when the second machine part is subjected to force.

At the same time, in the second component a release piston, which is intended to move the second machine part in or on the first machine part, is subjected to pressure. The release piston first of all comes to bear against the second machine part and then displaces the second machine part relative to the positionally fixed first machine part. The force which is introduced via the release piston is held by the relief piston, which bears against the collar of the first machine part, with the result that the force flux is enclosed within it.

The first and second components advantageously have diaphragm cylinders, which results in a particularly short constructional length which can easily be sealed. The diaphragm cylinders can be automatically resilient or can be brought into the starting position by an additional spring arrangement.

An adjusting mechanism which can be activated in a particularly simple manner is achieved with an electromagnetic or electrically powered adjustment. This saves on structural space for hydraulic or pneumatic supply ducts, with the result that an electromagnetic/electrically powered adjustment can be used, for example, in the case of multi-stage adjusting systems.

BRIEF DESCRIPTION OF THE DRAWINGS

In the following description the invention will be described in more detail with reference to the appended drawings. In the drawings

In FIG. 1, the device according to the invention is illustrated in an embodiment having diaphragm cylinders. Mounted in a rotatably mounted shaft 1 (first machine part) is a tension rod 2 (second machine part) which can be displaced in the axial direction, is held under tension by means of a spring assembly 3 and in the process holds or securely clamps a part, for example a replaceable tool (not depicted), which is mounted on the other end of the shaft.

Figure 1:
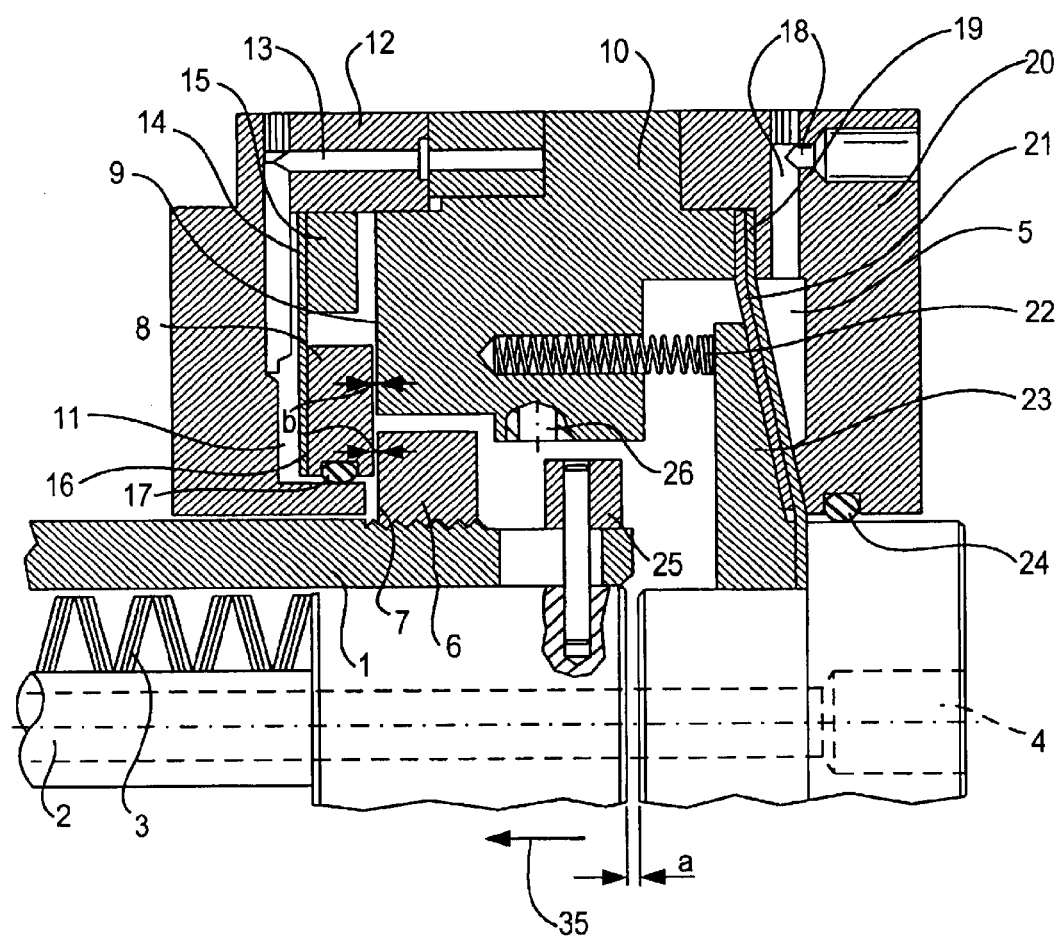
FIG. 1 shows a cross section of the device having diaphragm cylinders.

In order to replace this tool, the tension rod 2 has to be displaced counter to the spring force of the spring assembly 3 in the direction 35. For this purpose, the rotational movement of the shaft 1 is brought to a standstill. The pressure chamber 5 of the release piston 4 (second component for introducing force) is subjected to a pressure medium and moves the non-rotating release piston 4 counter to the tension rod 2 in the direction 35 by the distance a, which is necessary so as to prevent, when the shaft 1 is rotated, any contact between the rotating shaft 1 (or tension rod 2) and piston 4. After the stroke a, the force of pressure builds up at the release piston 4 to the extent necessary in order to displace the tension rod 2 counter to the spring assembly 3 to a sufficient extent axially in the direction 35 that the tool (not depicted) at the other end of the shaft 1 is released. Since the spring assembly 3 is supported in the shaft 1, this release force which is introduced also acts on the shaft 1, and therefore on the mounting with which the shaft 1 is mounted in the machine body. In order to avoid this axial additional load on the mounting, the shaft 1 is supported.

According to the invention, a collar 6 is provided for this purpose, which collar is connected fixedly to the shaft 1 and against whose plane bearing surface 7 the relief piston 8 (first component) bears, and therefore prevents any axial displacement of the shaft 1. The relief piston 8 is placed at the same time against the bearing surface 7 and against a stop surface 9 on the housing part 10. The free stroke b of the relief piston 8 to the bearing surface 7 and stop surface 9 is exactly the same, with the result that the shaft 1 is held in its position by the relief piston 8 via the collar 6 in a play-free and force-free manner.

The pressure which has built up in the pressure chamber 11 produces a force on the relief piston 8, which is greater than the release force of the release piston 4 and is supported on the stop surface 9. In this case, as illustrated in FIG. 1, the release force can be produced in an inherently closed (hydraulic) system or can act on the tension rod 2 from the outside.

The relief piston 8 is part of a subassembly which comprises the housing 12 together with the pressure chamber 11 and the orifices 13 for the inflow of the pressure medium of the diaphragm 14. The diaphragm 14 is connected to the housing 12 via the clamping ring 15 and in a leakproof manner to the annular relief piston 8 along a narrow annular surface 16. The relief piston 8 seals off the pressure chamber 11 with respect to the housing 12 by the sealing ring 17. When subjected to pressure, the relief piston 8 completes the short stroke movement b and is pulled back into its neutral position illustrated by the resilient diaphragm when the pressure is shut off. The diaphragm 14 is an annular disc made of thin, resilient material, preferably spring band steel, and interacts with the relief piston 8 as a piston which is of sufficiently large dimensions in order to apply the required axial counterforce, and pulls the relief piston 8 into the neutral position when unpressurized.

The release piston 4 faces the relief piston 8 and is connected via the housing part 10. The release force of the release piston 4 is produced in the pressure chamber 5. The pressure medium, which is supplied through the orifices 18, presses against the diaphragm 19, which is tightly clamped on its outer diameter between the housing part 10 and the housing part 20 of the release unit and is connected on its inner diameter to the release piston 4, and moves the release piston 4 in the direction 35 towards the tension rod 2.

After the idle stroke distance a, which is the safety distance which is necessary in order to prevent any contact between the tension rod 2 and release piston 4 while the shaft 1 is rotating, the release piston 4 presses against the tension rod 2 and displaces the latter relative to the shaft 1, after overcoming the spring force of the spring assembly 3, in order to enable the tool to be released and replaced. In the process, the shaft 1 is supported by the relief piston 8, which bears against the shaft collar 6, with the result that the shaft remains force-free. The force flux is inherently enclosed by the release piston 4 via the shaft collar 6, the relief piston 8 and the connected housing parts 12, 10 and 20.

Since the stroke of the release piston 4 is significantly larger than that of the relief piston 8, a two-part diaphragm can be provided. The tear-resistant, but very flexible, diaphragm 19 comprises a reinforced, rubber-coated fabric and is supported against bulging by the diaphragm part 21. This diaphragm part 21 preferably consists of a metal plate or very firm plastic, and is slit in a suitable manner starting from the inner edge radially as far as the clamping diameter in order to increase the axial mobility (cf. FIG. 3a).

The resetting movement of the diaphragms is achieved by means of springs 22 which press against the collar 23 on the release piston 4. The release unit is sealed off between the housing 20 and release piston 4 by the sealing ring 24. The diaphragm surface of the release unit (second component) is, in order to obtain good axial mobility, significantly larger than the diaphragm surface of the relief unit (first component) for introducing the counterforce. Accordingly, the pressure chambers 11 and 5 are supplied with different pressures through the orifices 13 and 18.

Since, when being subjected to pressure, the volumetric flow in the relief unit is substantially smaller than in the release unit, it is ensured that, when simultaneously subjected to pressure (by means of a common hydraulic system), the relief piston 8 bears against the collar 6 before the release force by means of the release piston 4 becomes effective. In order to monitor the release movement of the tension rod 2, a signal ring 25 is connected to the tension rod 2, said signal ring participating in the stroke movement, so that the sensor in the orifice 26, which sensor is fastened fixedly or adjustably in the housing part 10, is activated. One or more sensors can be mounted next to one another or offset around the circumference (not depicted).

Figure 2:
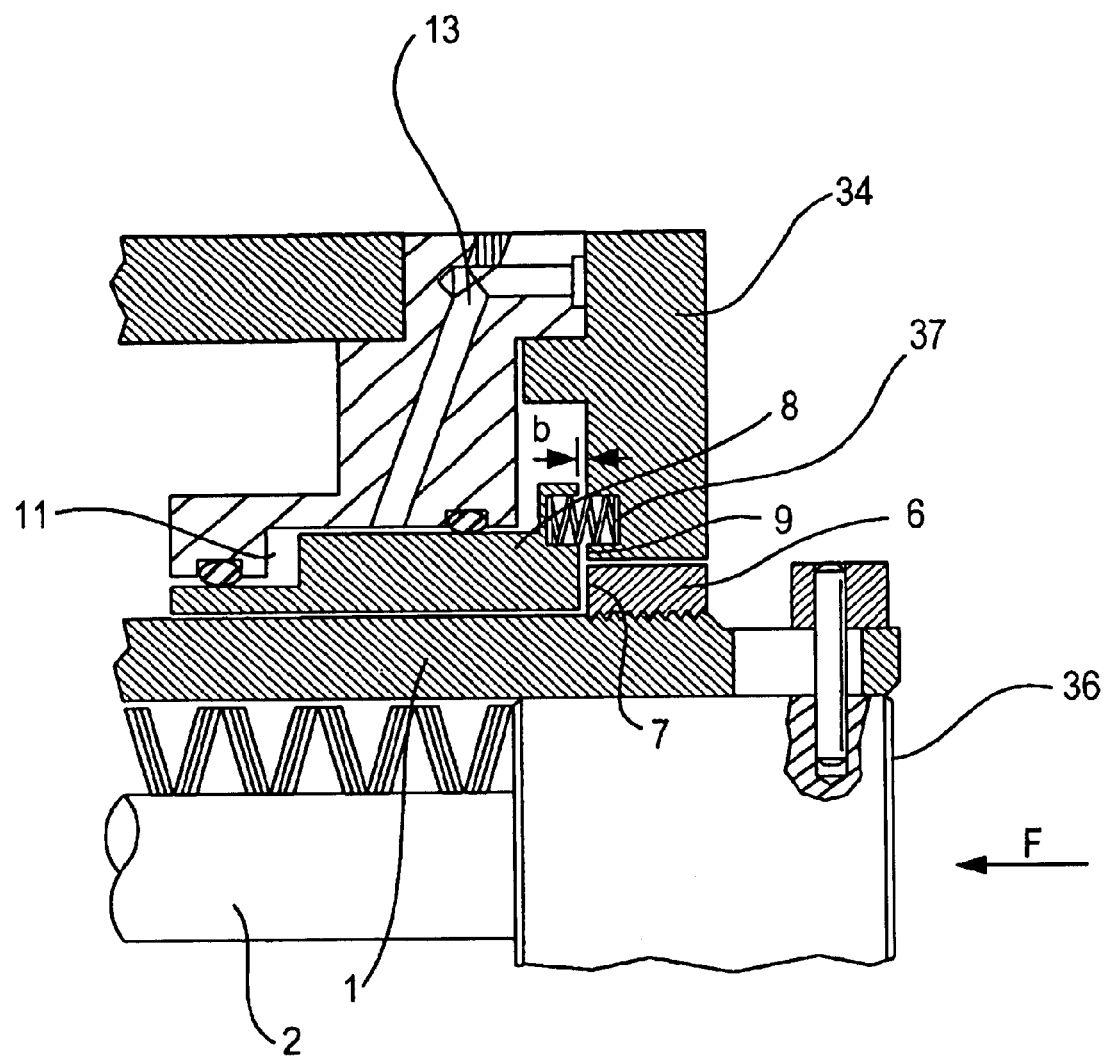
FIG. 2 shows a cross section of the device having a piston arrangement.

In FIG. 2 the first component has a piston arrangement. The shaft 1 is connected fixedly to the collar 6. The bearing surface 7 of said collar is at precisely the same distance b from the relief piston 8 as the latter is from the stop surface 9 on the housing cover 34. The relief piston 8 is subjected to pressure medium through the orifices 13 in the pressure chamber 11 and is moved against the bearing surface 7 and stop surface 9, where it bears with a force which is greater than the force F of the release piston 4 (not depicted), which force is introduced at the tension-rod head 36 of the tension rod 2. The relief piston 8 is set back into the starting position by means of the spring force of the spring 37 or, if the relief piston 8 is correspondingly designed as a double-acting piston, by means of the counterpressure (not depicted).

Figure 3A:
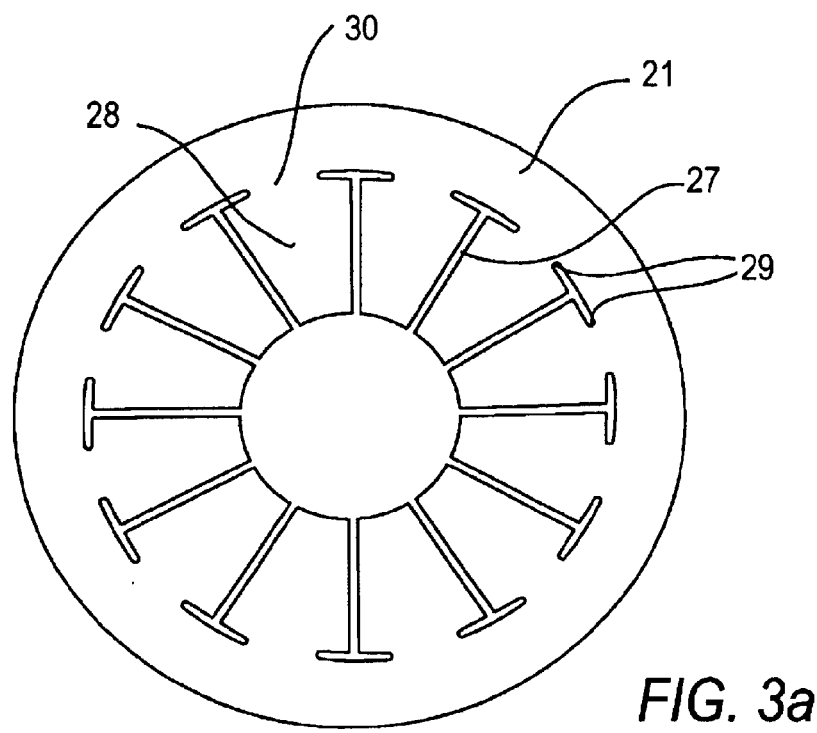
FIG. 3a shows a first embodiment of a diaphragm part according to FIG. 1.

FIG. 3a shows one possible embodiment of a diaphragm part 21 which supports the flexible diaphragm 19 over its entire surface. The diaphragm part 21 is at the same time concentrically clamped by its outer edge zone together with the diaphragm 19 between the housing parts 10 and 20. The supporting surface of the diaphragm part 21 for the flexible diaphragm 19 is separated into a multiplicity of sectors 28 by thin, radial slots 27. The mobility of the individual sectors 28 is made easier, in a hinge-like manner, by the tangential slots 29, which leave only a sufficiently short connection 30 behind. Since the inner edge of the diaphragm part 21 is free, a supporting element, which overall is readily moveable, is therefore produced, said supporting element being moved to and fro by the compressive force of the diaphragm 19, on the one hand, and by the restoring force of the spring 22, on the other hand.

Figure 3B:
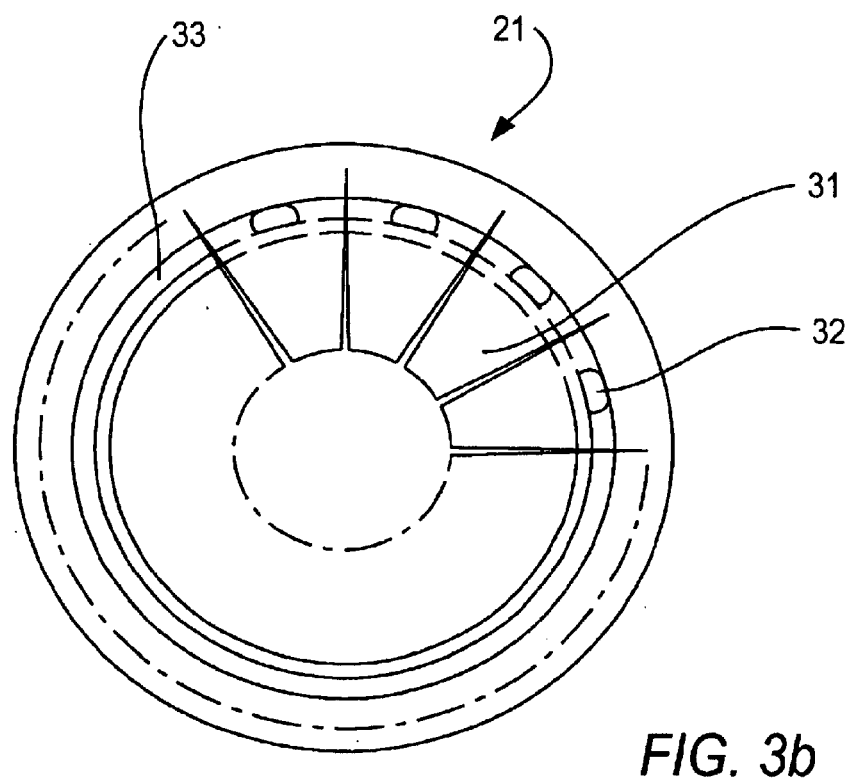
FIG. 3b shows a second embodiment of a diaphragm part according to FIG. 1.
Figure 4:
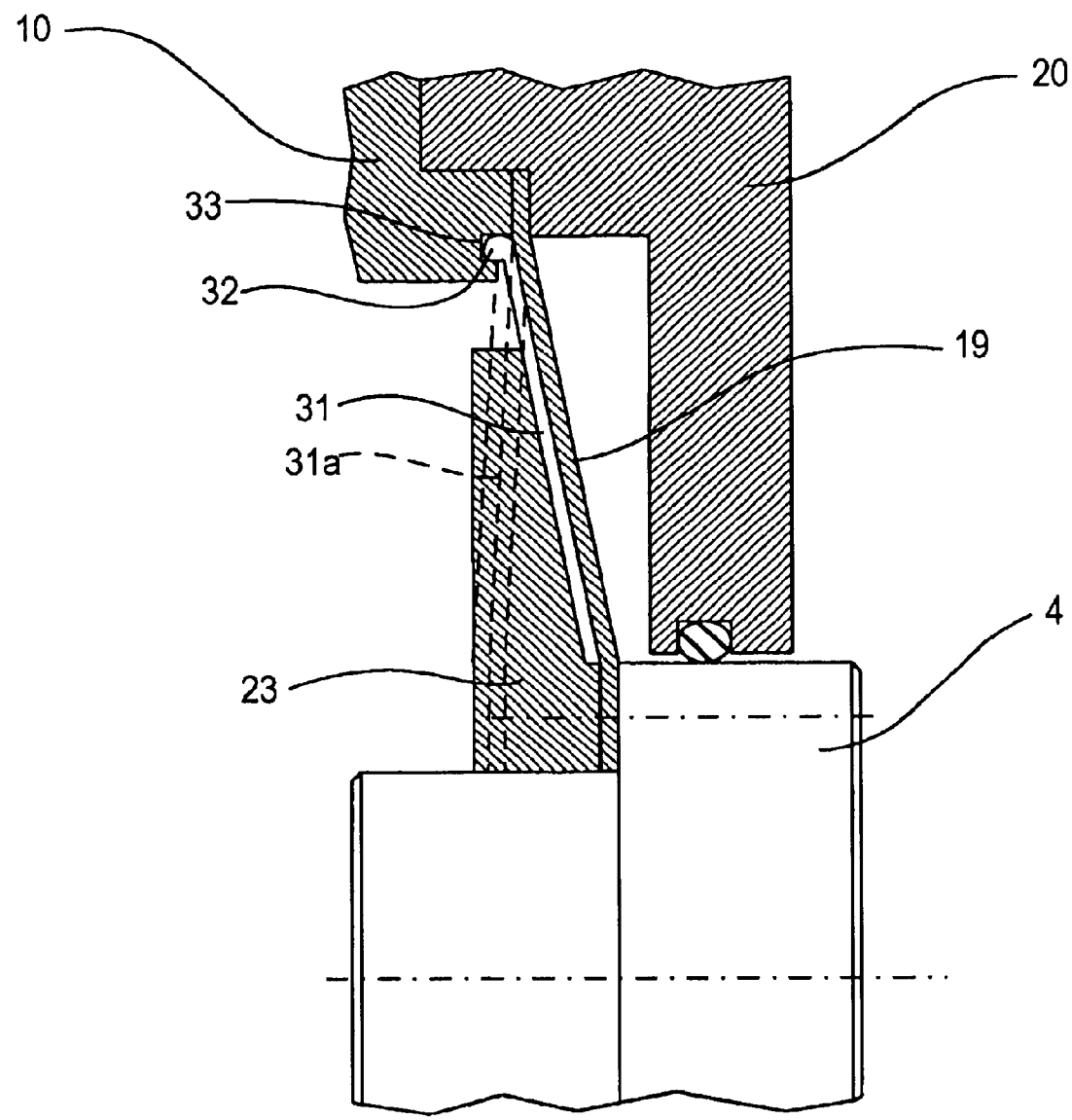
FIG. 4 shows an illustration of a diaphragm cylinder according to FIG. 1 having a diaphragm part according FIG. 3b.

FIG. 3b shows a further design of a diaphragm part 21. Here, the supporting surface of the diaphragm part 21 for the flexible diaphragm 19 comprises individual segments 31 which are not connected to one another and are fitted at the outer edge, by means of a cylindrical thickening 32 in the housing part 10, into an annular groove 33 in a manner such that they can tilt in the axial direction (cf. FIG. 4). These segments 31 bear against the flexible diaphragm 19 and are pressed against the diaphragm 19 by means of the spring 22 and the collar 23 on the release piston 4. In FIG. 4, the two segments 31 and 31a of the diaphragm part 21 are also illustrated in a relaxed and actuated (depiction using dashed lines) switching position of the release piston 4.

Figure 5:
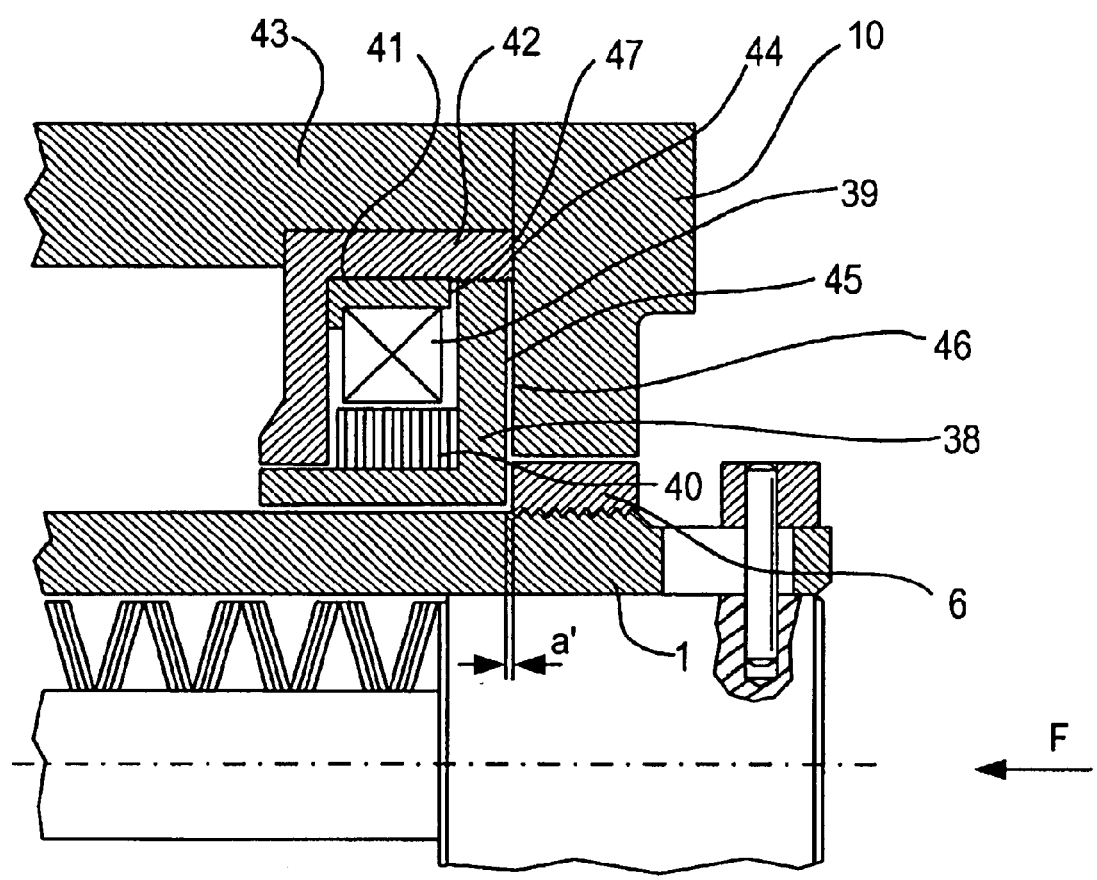
FIG. 5 shows a cross section of the device having electromagnetic/electrically powered adjustment.

FIG. 5 shows a further embodiment of the device having electromagnetic/electrically powered adjustment, in order to prevent an axial movement in the force direction F. The axially moveable stop 38 is moved by an electric motor or rotary magnet consisting of the stator 39 and the rotor 40. The stator 39 is enclosed by a thick-walled sleeve 41 which is pressed into the housing 42, which in turn is held in a twist-proof manner by the spindle sleeve 43. The rotor 40 is fastened in a twist-proof manner on the axial part of the stop 38. The stop 38 is connected rotatably to the housing 42 via the thread 44, as a result of which, when the stop 38 is rotated by the electric motor/rotary magnet, the axial movement a' of the stop 38 between the stop surface 45 and the stop surface 46 of the housing part 10 takes place.

When the stop 38 is activated, the stop surface 46 and the collar 6 of the shaft 1 are made contact with via its stop surface 45, and the collar 6 is supported. The deactivated stop 38 bears against the sleeve stop surface 47 of the sleeve 41. The thread 44 is self-locking, with the result that the stop surface 45 cannot be displaced relative to the stop surface 46 under the load F. The electric motor/rotary magnet is supplied with power via wires (not depicted).

Figure 6:
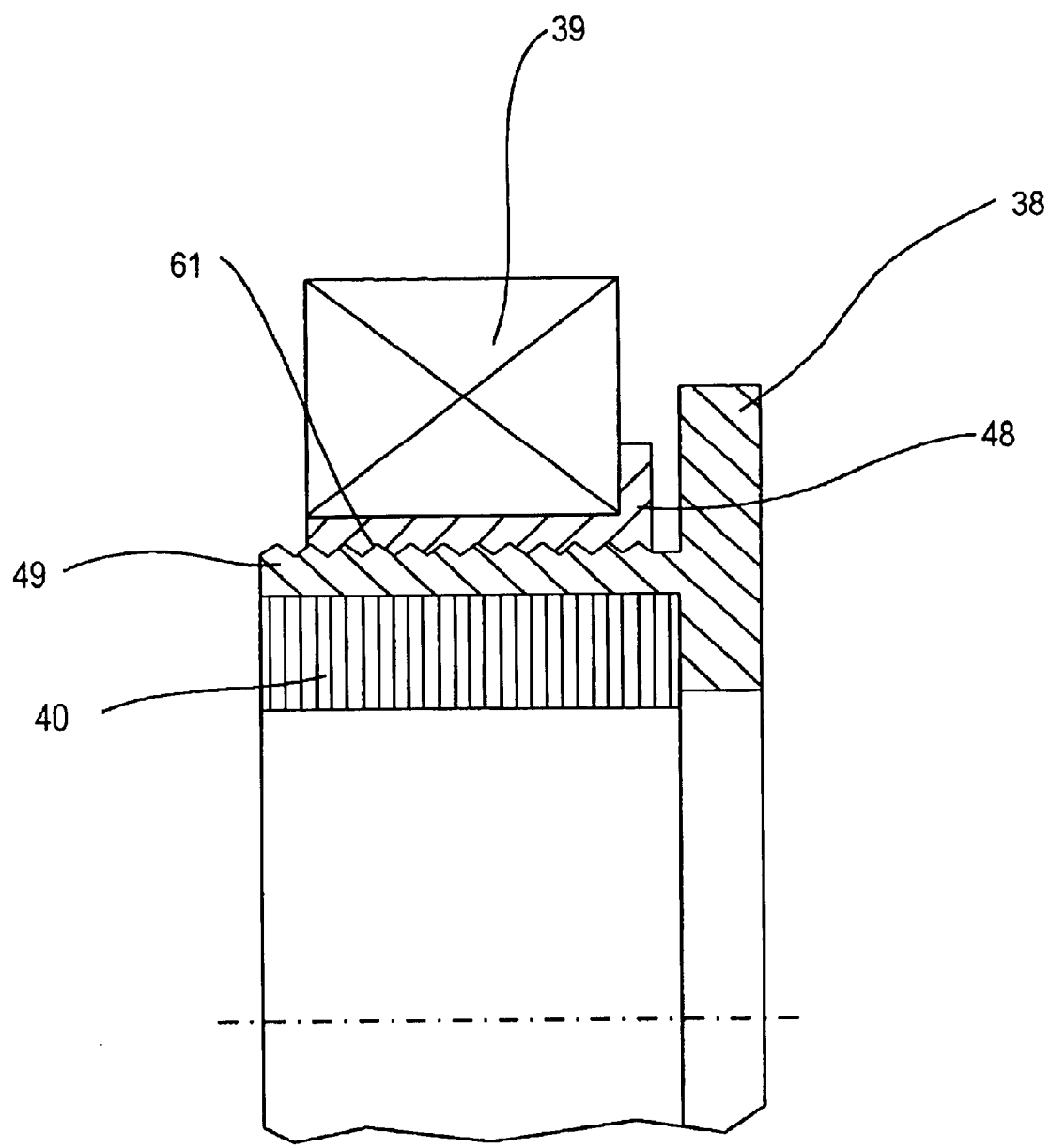
FIG. 6 shows a schematic illustration of an embodiment having electromagnetic/electrically powered adjustment.

FIG. 6, along with FIG. 5 shows a further schematic illustration of an electromagnetic/electrically powered adjustment. A thread 61 is mounted in the air gap between the stator 39 and and rotor 40. The stop 38 is shown. The stator 39 has an inner part (for example made of plastic) having an inner thread 48 which is screwed to an outer part of the rotor 40 with an outer thread 49. By this means, the rotor 40 is mounted radially and when rotated in the stator 39 executes the adjusting movement a' according to FIG. 5.

The electromagnetic/electrically powered adjusting mechanisms depicted in FIGS. 5 and 6 can be combined with all of the arrangements depicted or described in FIGS. 1-4 for activating the release piston 4.

What is claimed is:

1. Device for supporting a first machine part when a second machine part is subjected to a force in a longitudinal axial direction thereof, wherein said second machine part is mounted on the first machine part, wherein the first machine part is a shaft (1) having the second machine part which is a tension rod (2), which tension rod is displaced in the axial direction when the tension rod (2) is subjected to the force, comprising:

a first adjustable component provided for introducing a counterforce, to counter the force from the second machine part, into the first machine part for the purpose of supporting the first machine part in a stable position relative to the second machine part, the first adjustable component has an electromagnetic or electrically powered adjusting mechanism, and a rotor (40), wherein the rotor (40) is connected to an adjustable stop (38) and the stop (38) is connected displaceably to a housing (42) via a thread (44); and a second adjustable component provided for subjecting the second machine part to the force, wherein the second adjustable component is designed as a diaphragm connected to a moveable piston.

2. Device according to claim 1, wherein the shaft (1) has a collar (6) for use as a bearing surface when introducing the counterforce.

3. Device according to claim 1, wherein the tension rod (2) has a tension rod head (36) for use when being subjected to force.

4. Device according to claim 1, wherein the second component has a release piston (4) for subjecting the second machine part or the tension rod (2) to force.

5. Device according to claim 4, wherein the release piston (4) is arranged resiliently via a spring element (22).

6. Device for supporting a first machine part when a second machine part is subjected to a force in a longitudinal axial direction thereof, wherein said second machine part is mounted on the first machine part, wherein the first machine part is a shaft (1) having the second machine part which is a tension rod (2), which tension rod is displaced in the axial direction when the tension rod (2) is subjected to the force, comprising:

a first adjustable component provided for introducing a counterforce, to counter the force from the second machine part, into the first machine part for the purpose of supporting the first machine part in a stable position relative to the second machine part, wherein the first component has an electromagnetic or electrically powered adjusting mechanism, a stator (39) and a rotor (40), and the rotor (40) is connected to an adjustable stop (38) and the stop (38) is connected displaceably to a housing (42) via a thread (44); and a second adjustable component provided for subjecting the second machine part to the force, wherein the second adjustable component is designed as a diaphragm connected to a moveable piston.

\* \* \* \* \*

UNITED STATES PATENT AND TRADEMARK OFFICE
CERTIFICATE OF CORRECTION

PATENT NO.    : 6,814,528 B1
DATED         : November 9, 2004
INVENTOR(S)   : Feldmeier, Fritz It is certified that error appears in the above-identified patent and that said Letters Patent is hereby corrected as shown below:

<u>Title page,</u>
Item [73], Assignee, "Nuremberg" should be -- Nurmberg --; and "199 55 907.4" should be -- 199 55 907 --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO.   : 6,814,528 B1
DATED        : November 9, 2004
INVENTOR(S)  : Feldmeier, Fritz It is certified that error appears in the above-identified patent and that said Letters Patent is hereby corrected as shown below:

Title page,
Item [73], Assignee, "Nuremberg" should be -- Nurnberg --;
Item [30], Foreign Application Priority Data, should read:
-- Nov. 20, 1999    (DE) ............... 199 55 907.4 --.

This certificate supersedes Certificate of Correction issued July 5, 2005.

Signed and Sealed this

Sixth Day of September, 2005

JON W. DUDAS
*Director of the United States Patent and Trademark Office*